United States Patent [19]

Dalke

[11] 4,196,447
[45] Apr. 1, 1980

[54] FACSIMILE TO VIDEO CONVERTER

[75] Inventor: James Dalke, Bellevue, Wash.

[73] Assignee: Arvin Industries, Inc., Columbus, Ind.

[21] Appl. No.: 897,281

[22] Filed: Apr. 17, 1978

[51] Int. Cl.$^2$ .................... H04N 9/02; H04N 7/14; H04N 5/02; H04N 1/00

[52] U.S. Cl. ............................ 358/82; 358/85; 358/140; 358/256

[58] Field of Search ............... 358/82, 85, 140, 256; 343/5 CD

[56] References Cited

U.S. PATENT DOCUMENTS

| | | | |
|---|---|---|---|
| 2,822,536 | 2/1958 | Sandretto | 343/5 CD X |
| 2,901,747 | 8/1959 | Sunstein | 343/5 CD X |
| 3,792,194 | 2/1974 | Wood et al. | 358/140 X |
| 3,806,644 | 4/1974 | Browne et al. | 358/140 |
| 3,810,174 | 5/1974 | Heard et al. | 358/140 X |
| 3,832,487 | 8/1974 | de Niet | 358/140 |
| 3,904,817 | 9/1975 | Hoffman et al. | 358/140 |
| 3,976,831 | 8/1976 | Danell et al. | 358/85 X |
| 4,002,827 | 1/1977 | Nevin et al. | 358/140 X |
| 4,010,466 | 3/1977 | Hofstein | 358/140 X |
| 4,054,914 | 10/1977 | Fukuoka | 358/256 |
| 4,057,836 | 11/1977 | Munsey | 358/140 |
| 4,110,795 | 8/1978 | Spencer | 358/256 X |

OTHER PUBLICATIONS

Robot Instruction Book: Robot Research Inc.
"Electronic Converter for Graytones into Color", *Electronik*, vol. 24, No. 5, pp. 56-58, May 1975: Bauer.
"Advances in Facsimile"; 7th International Conference on Communications, Montreal, Canada (Jun. 14-16 1971): Burkhard.
"Development of High Speed Facsimile"; *Review of the Electrical Communication Labs.*, vol. 23, No. 5-6, pp. 469-489, May-Jun. 1975; Kobayashi et al.

*Primary Examiner*—Robert L. Griffin
*Assistant Examiner*—Aristotelis M. Psitos
*Attorney, Agent, or Firm*—Biebel, French & Nauman

[57] ABSTRACT

Facsimile weather radar information (800 lines/frame) is stored, every third line, in a solid state RAM 35, capacity 256 three bit words per line, 256 lines. Subdivision of digital information from A/D converter 30 into digital words is accomplished using division by seven of television horizontal sync. The RAM is read at TV line rate (15.75 KHz) and lines of digital information clocked out of RAM at 1.59 MHz under control of a 14.3 MHz master oscillator which can be locked to external TV sync. Digital RAM output is processed into an analog signal, then through colorizer and blanking circuits (42 and 45) which insert synchronizing and color burst information, producing a broadcast compatible composite television output, presentable on color TV receivers with blue background and clouds, precipitation, etc., varying intensities of yellow.

Input may be alternated between separate AM and FM detectors (15 and 19) from either mode of input transmission, and lower frequency horizontal and vertical sync is separated from the input. Black level adjustment of input signal is provided. Circular sweep at a nominal slow speed is mixed into the output signal.

8 Claims, 7 Drawing Figures

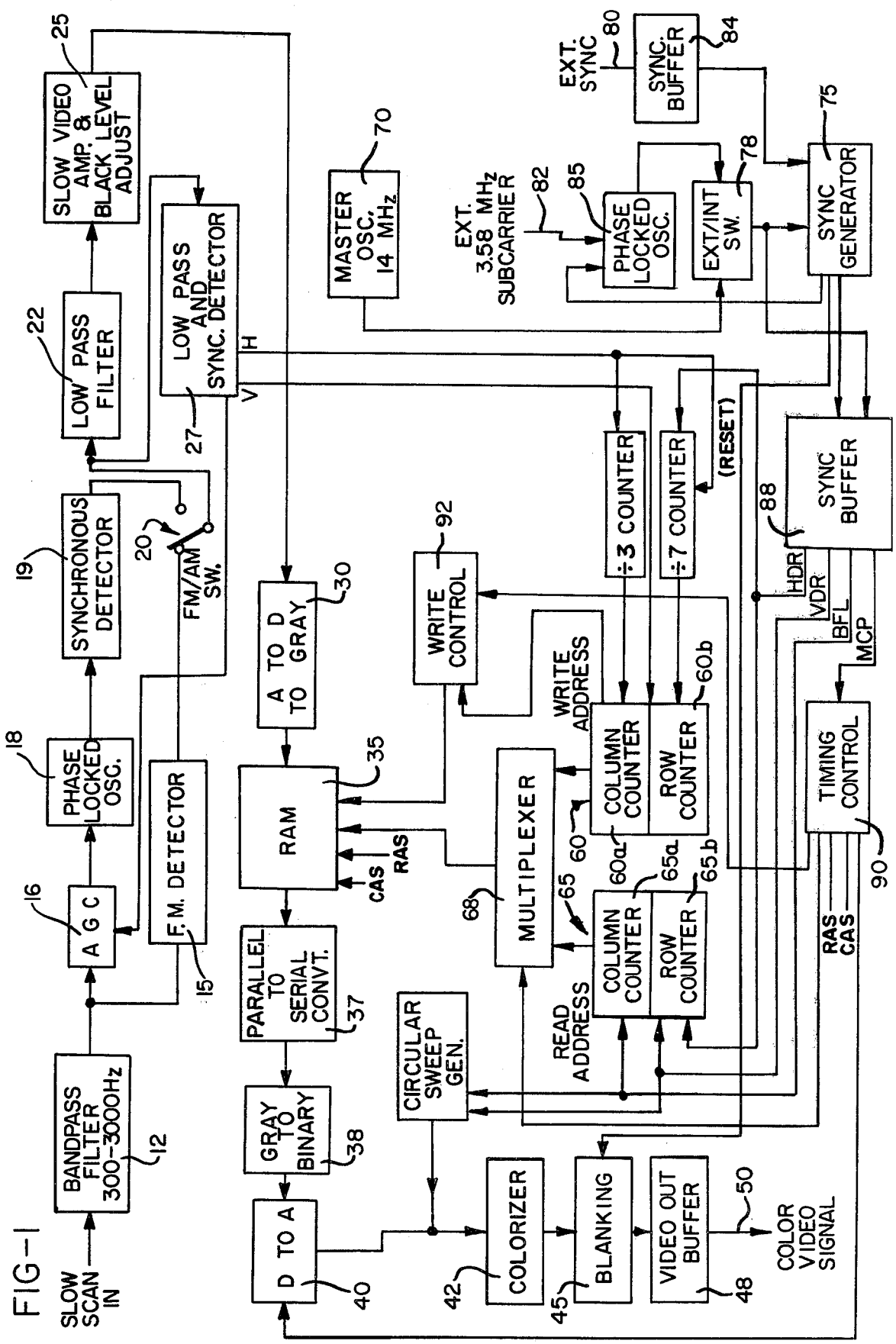

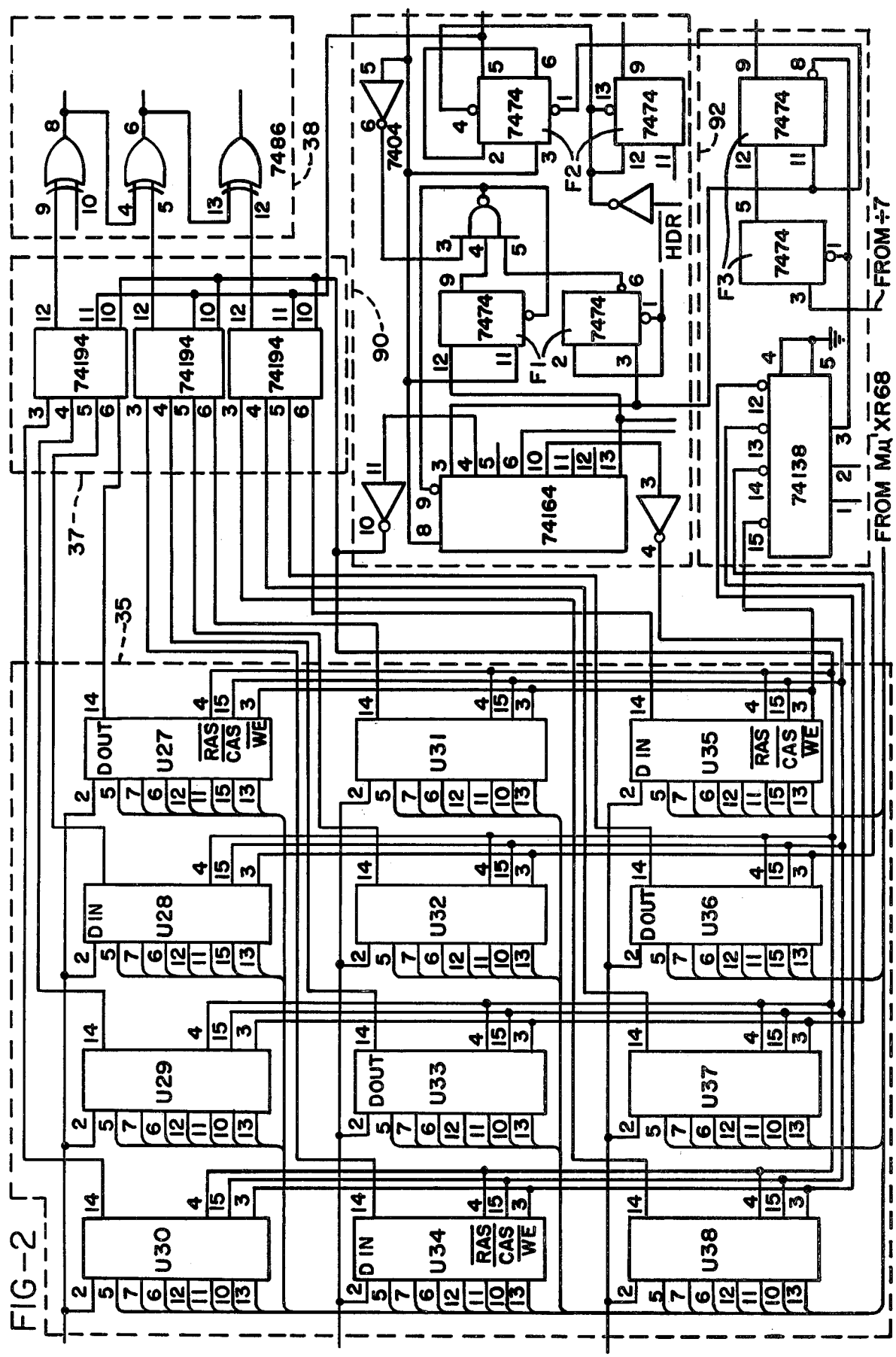

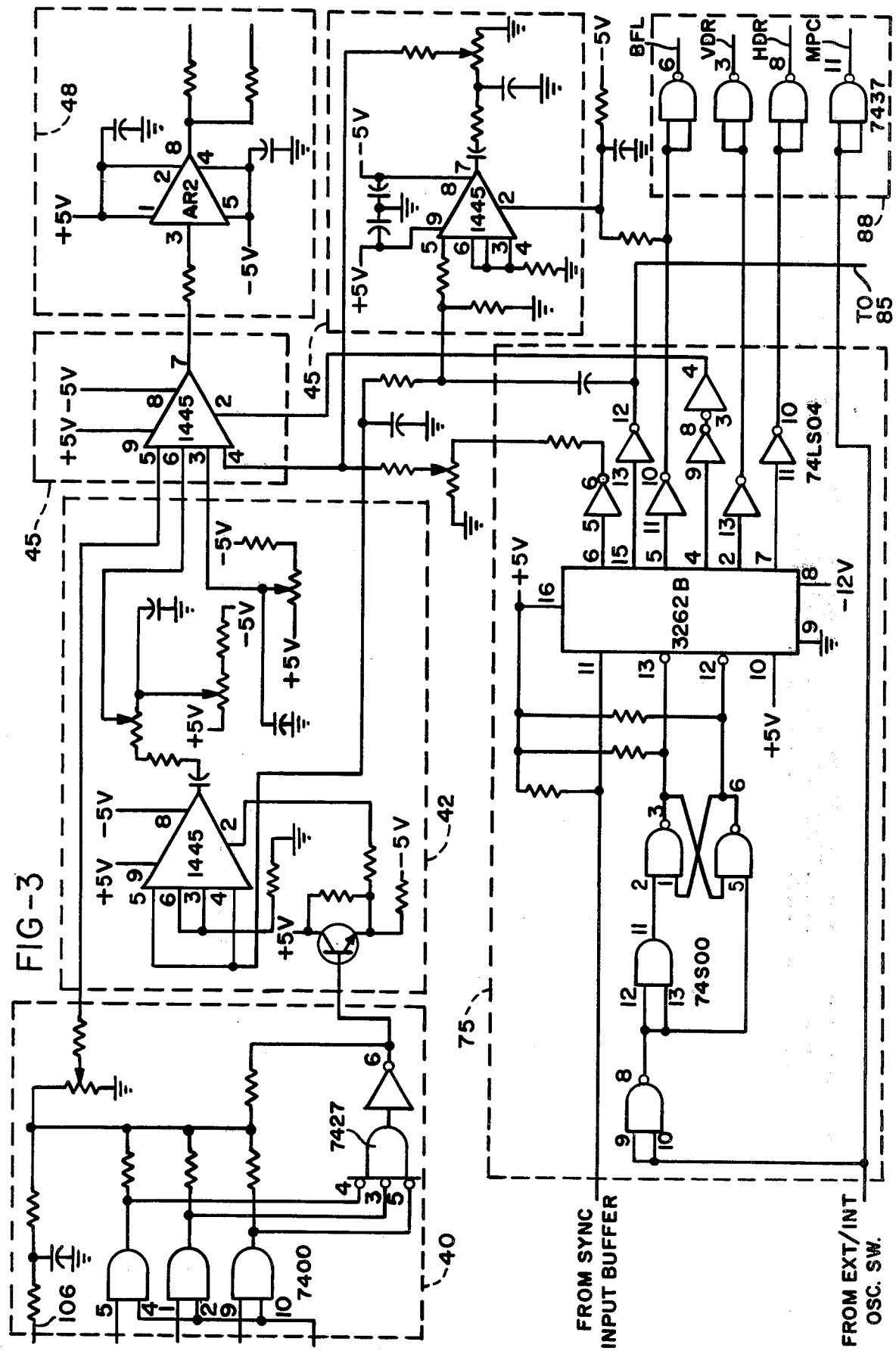

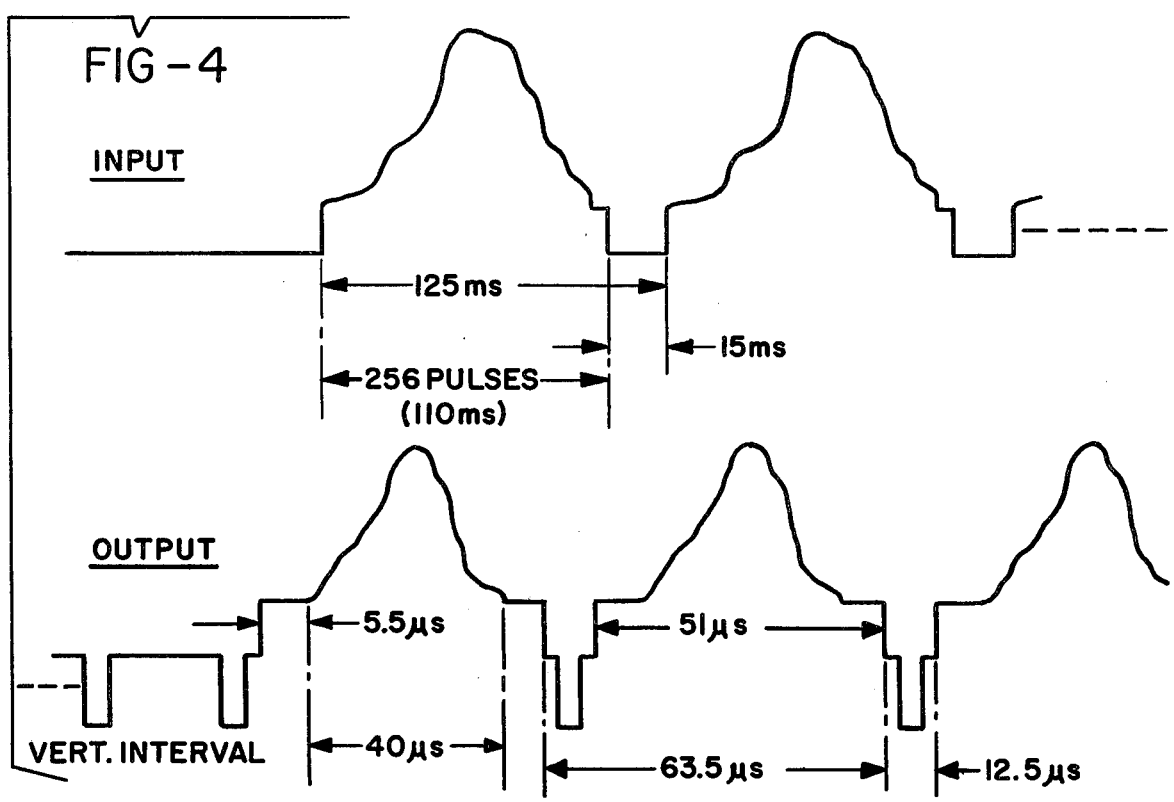
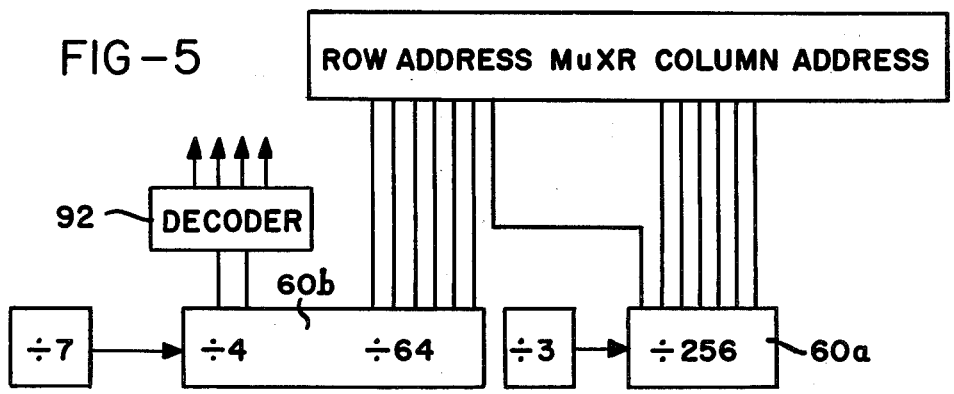
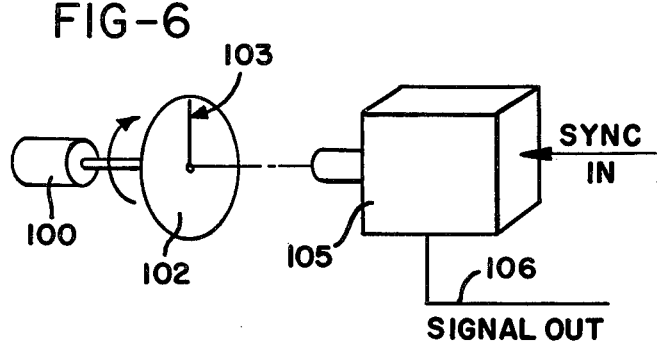
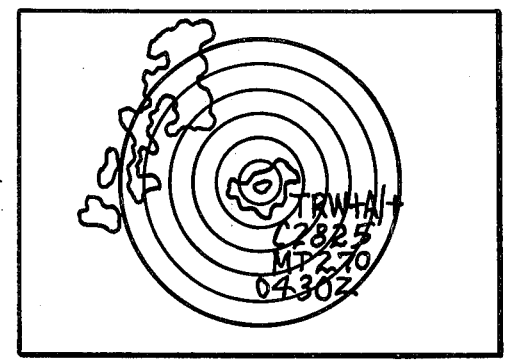

FACSIMILE TO VIDEO CONVERTER

BACKGROUND OF THE INVENTION

This invention relates to the conversion of lower frequency picture information, such as a facsimile signal, transmittable over audio communications equipment such as telephone line, into a broadcast compatible video signal. While there are many possible uses of such equipment, the present invention is particularly directed to the production of broadcast compatible video pictures from the output of various weather radar operated by U.S. National Weather Service.

The Weather Service has a number of weather radar stations throughout the United States, each presenting a radar picture which is transformed from rho-theta to direct linear display by using a vidicon camera. Essentially, this is done by focusing the camera on the display tube of the radar unit. A transparent overlay is provided to the weather radar tube, providing an outline of a map of topographical features, such as shorelines, state boundaries, etc., within the range circles which correspond to the range at which that particular radar unit is operating. This overlay also provides a surface for notes made by the on-site meterologists.

The picture is transmitted over 3 KHz telephone lines at a rate of one frame every one hundred seconds, and is intended to be displayed on a storage tube at the receiving location, or to be reproduced by standard facsimile machines operating at 8 lines per second. The single frame of low frequency picture information thus is comprised of 800 lines of video information, together with horizontal sync components which indicate the end of each line, and a vertical sync component which identifies the end of the frame.

This signal is available in two different ways. In one mode of operation, the signal is frequency modulated and is available through standard telephone lines, which can be dial accessed by members of the public having the proper information to do so. The other mode uses amplitude modulation and transmission over dedicated lines which must have certain standard requirements as to frequency response, etc. In either event, the same picture information is available for receiving and detection, depending upon whether the receiving unit wishes to use dedicated lines or the conventional dial telephone facilities for access to this information.

There is substantial demand for current weather information, to be made available to the public at large through television broadcasting stations, or through cable systems, and also to be made available to various interested parties such as private meterologists, newspapers, airport offices, and the like. The use of the facsimile type picture signal, however, is an impediment to full utilization of this weather radar information, since this type of facsimile receiving receiving equipment is often not as convenient to use, and it is much more convenient to disseminate the weather radar pictures over established television systems, whereby the pictures can be used on ordinary television receivers.

Furthermore, through the use of the commercial telephone lines and various types of manual or automatic dialing equipment, and through the use of video frame recording devices which are available, it is possible to access several or even all of the various weather radar stations properly equipped and compile weather information for the entire weather radar system or along a particular path through the system, or for a particular geographical area. For example, a television or cable TV operation in a particular locality might wish to survey not only the weather radar unit within range of which it is located, but also other areas through which oncoming weather is expected. Thus, it is possible to present an up-to-date visual display of storms and to permit viewers to follow their movement on a current basis, or on a summarized basis.

The present invention, therefore, is concerned with the conversion of facsimile picture information to broadcast compatible video signals, preferably color signals, whereby the weather radar pictures can be displayed via standard television transmission means.

SUMMARY OF THE INVENTION

In accordance with the invention the lower frequency picture information, which is transmittable for example at audio frequencies over telephone lines or similar audio communications equipment, is presented as either frequency modulated or amplitude modulated signals divided in accordance with a standard facsimile picture presentation, in the case of the weather radar units 800 lines per frame of picture at a rate of eight lines per second. The picture signal includes horizontal sync components identifying the end of each line, and a vertical sync component. This picture is without color information, and if reproduced on a compatible facsimile machine, will provide a black and white signal which is on a gray scale sufficient to show clouds, rain, or other precipitation, with respect to a background. This can be a white background and various shades of gray to black representing the clouds and precipitation by inverting the signal during printing.

In accordance with the invention this information, one frame at a time, is stored in a solid state random access memory (RAM) and the RAM is then scanned and read at higher speed, corresponding to broadcast compatible television signals. Color information is inserted into the output television signal along with all the necessary video sync for a standard broadcast compatible color television signal. The resulting picture is presentable on a standard color TV receiver with the background being a relatively dark blue, and the clouds, precipitation, etc., being presented as varying intensities of yellow.

The television signal is synchronized with the facility to which the signal is presented so that it may be broadcast or transmitted over high frequency lines, as desired, in the nature of any other television signal.

The incoming facsimile type (slow scan) signal preferably is initially processed through a band pass filter to eliminate extraneous noise, and may then be routed though an appropriate detector. In systems where operation may be alternated between dedicated lines and standard telephone lines, separate AM and FM detectors are provided, with an appropriate output switch, so that detection is possible from either mode of transmission. The detected signal is then processed through a low pass filter on the one hand, to remove the carrier components and is then amplified as necessary. The signal is also processed through a separate low pass filter and sync detector circuit, which separates the horizontal sync signals from the incoming information, and also provides a form of vertical sync signal by reason of detecting a "missing pulse" situation in the detected horizontal sync signal. Thus, the sync detector circuits provide separated horizontal and vertical sync information at the slow scan rate.

It is desirable to provide a level adjustment in the picture component filtered from the incoming signal. Although in the case of the weather radar stations the black level is supposed to be adjusted to a common value from all stations, in practice it has been found that there may be some deviation in black level, which could be due to slight differences at the stations themselves, or losses or interference in the transmission lines. Thus, it has been found desirable to provide a black level adjustment of the picture component of the signal for this purpose.

The adjusted picture signal is then processed through an analog to digital conversion which in turn converts the information into gray code, for example at an eight step or eight level value. This digital information is then presented to a random access memory (RAM), and is stored in the RAM as a group of digital words equal to one line of picture information.

In the case of the weather radar signals, it has been found that although 800 lines per frame of information was selected for compatibility with existing facsimile equipment, in fact the resolution of the picture information is not that high. In order to accommodate to a corresponding television display, the incoming information is separated, and only partially stored. This is conveniently accomplished by using the lower frequency horizontal sync signal, dividing it by three, and using the resultant output to control the row counter of the Write Address counter for the RAM. The net effect of this is that the digital word group for one line is inputed to the same row location in the RAM three times over, and the digital word actually stored in the RAM are those of the third incoming line, the sixth line, etc.

The subdivision of the digital output information from the A to D converter into individual digital words is conveniently accomplished by using an appropriate division of the broadcast compatible television horizontal sync information. This signal, at 15.75 KHz according to the NTSC system, is available from the internal sync generator of the system (as later described) and thus it can readily be divided to provide a convenient number of digital words per line. Since the radar output facsimile picture is generally at a 1:1 aspect ratio, and since the number of lines per field in the television signal is 262½, a convenient random access word storage is 265×265×3; 800 lines divided by three is 266. Thus, the information stored in the RAM is sufficient to provide 256 three-bit gray code words per line, for 256 lines of picture information. The individual digital words are sometimes referred to as pixels, a contraction of picture elements. This, of course, provides stored information of the picture at a 1:1 aspect ratio, for which certain accommodation is required into the standard television picture, as is later explained.

The information is read from the RAM at the broadcast compatible TV line rate, i.e., 15.75 KHz, and each line of digital word groups is clocked out of the RAM at about 1.59 MHz under the control of a master oscillator which in turn drives a timing control. The master oscillator provides a master clock pulse signal at 14.3 MHz, and this can be internally generated by an appropriate master crystal controlled oscillator, or alternatively a phase lock oscillator is used to provide this signal, referencing from external 3.58 MHz color subcarrier signal when the latter is available as an input to the device.

The digital information read from the RAM is processed through a parallel to serial converter, in order to accommodate the higher speeds at which the RAM must be accessed during the read mode, and the digital words are converted from gray to binary code, and then from a digital to analog signal, by appropriate converters and summing networks. The resultant analog information is applied to a colorizer circuit which sets the black level of the signal at the proper phase for producing blue background in a color signal, with the luminance portion of the signal being reproduced as varying intensity of yellow. This signal is then processed through a blanking circuit which inserts the necessary synchronizing and color burst information into the signal, producing a broadcast compatible composite television output which may be made available through an output buffer circuit for transmission, reproduction, etc., as may be desired.

The picture as displayed on a television receiver is stationary. Also, with reference to the weather radar system previously discussed, telephone access through the lines is automatically interrupted once two vertical intervals of slow scan output have passed to the incoming hook up. The purpose of this is to make the output of the weather radar stations available to as large a number of people as possible, thus after a call is completed, the output of the weather radar station will transmit until two vertical intervals have passed (in time this represents no more than two hundred seconds) and then will automatically disconnect. This assures that each incoming call receives one full frame of the outgoing facsimile picture, but then makes the transmitting equipment available to others by automatically disconnecting.

As a result, it has been felt that the stationary picture displayed on a television receiver lacks dynamics. It is a static picture, in the nature of looking at a map. To introduce action into the picture, a circular sweep function generator is provided which introduces a circular sweep at a nominal slow speed into the output signal. This appears as a line slowly rotating through the picture with its axis of rotation centered on the station location, at the middle of the range target presented in the picture. This sweep is produced purely for purposes of aesthetics and dynamics, and does not relate to the actual sweep of the weather radar unit producing the picture.

The principal object of the present invention, therefore, is to present a method and apparatus for converting slow scan picture information, transmittable within ordinary audio frequency circuits such as telephone circuits, into a broadcast compatible composite television signal which may be transmitted through ordinary television signal channels and circuits, and displayed on standard television receivers; to provide such a method and apparatus which is particularly adapted to receiving picture information from weather radar stations, storing such information in a solid state random access memory, and reading out the picture information from the RAM at broadcast television rates, preferably introducing color information such that the picture may be received and displayed on color television receivers; to provide such a method and apparatus wherein a circular sweep function is introduced to the output television signal, to lend dynamics to the still weather radar picture; and to provide such a method and apparatus wherein the timing controls for writing into and reading from the RAM are derived from the sync signals detected from the low frequency input picture information, and also from the standard television sync signal which are available from ordinary sync generating equipment.

Other objects and advantages will be apparent from the following description, the accompanying drawings and the appended claims.

IN THE DRAWINGS

FIG. 1 is a system block diagram;

FIG. 2 is a circuit diagram showing the RAM, the timing controls, and RAM output;

FIG. 3 is a circuit diagram showing the D/A converter, colorizer, blanking, and television sync generation;

FIG. 4 is a diagram representing the input and output signals;

FIG. 5 is a block diagram of details of the write address control;

FIG. 6 is a schematic representation of a circular sweep generator; and

FIG. 7 is an illustration of a typical video output scene.

DESCRIPTION OF THE PREFERRED EMBODIMENT

FIG. 1 is a system block diagram on which the input lower frequency signal is represented by the legend "slow scan in," being supplied to a band pass filter circuit 12 which simply provides high and low band pass filtering, the low pass being in the order of 300 Hz, and the high pass being in the order of 3,000 Hz for a typical facsimile picture signal, such as used by the weather radar service. This filter simply cleans up and rejects noise from the incoming signal. The output of the band pass filter circuit follows two paths, which ultimately are used alternatively. As previously explained, if the signal is transmitted over conventional dial up telephone lines, it is a frequency modulated signal, and therefore the signal proceeds to an FM detector circuit 15. If the signal is transmitted into the system over a dedicated line an amplitude modulated signal is used, in which case the signal proceeds to an AM detector circuit which comprises, as shown, an automatic gain control 16, a phase locked oscillator 18, and a synchronous detector 19. Typical circuits are built around a Motorola type MC 3340 for the AGC circuit, a Signetics type NE565 phase lock oscillator circuit, and a Motorola type MC 1496 synchronous detector circuit. The output of the synchronous detector circuit and the output of the FM circuit 15 are each fed to an FM/AM selector switch 20 which can be shifted depending upon the type of a signal and detection being used.

The detected signal then passes to a further low pass filter circuit 22 which has a cut off on the order of 900 Hz, thereby filtering carrier frequencies which are not a part of the picture component of the signal. The filtered picture component of the signal then is directed to a video amplifier circuit 25 which also incorporates the necessary adjustment for possible correction of black level and white level of the signal.

Separately, the detected signal from the FM/AM switch also passes to a low pass filter and sync detector circuit 27, which separates the horizontal sync component (output H) from the low frequency picture signal, and through use of a missing pulse detector provides an output corresponding to the vertical sync of the low frequency picture signal. In addition, the sync detector circuit incorporates a conventional threshold detector which, together with a buffer amplifier, provides feedback signal to the automatic gain control circuit 16 when operating in the AM mode.

The level adjustment in the slow video amplifier circuit is provided by attenuating the filtered input to the amplifier for purposes of white level adjustment, and by adjusting the DC bias on the amplifier for adjustment of black level. This is desirable since there is no guaranteed black level in facsimile picture transmission, as is available in television signals. The value of black level in the FM mode is 1500 Hz, but it has been found that this will vary somewhat, as between different stations from which pictures are being received. The reason for this variance is not known. It could be due either to slight drift in the equipment at the station, or to somewhat inaccurate setting. In any event, it is desirable to have a black level adjustment available in order to provide a signal which in all instances is at a common black level.

The output from the slow video amplifier is directed to an A to D converter circuit 30, which also incorporates further conversion from a binary code to a conventional gray code, which expresses the scale of the video signal on an eight level basis with a three-bit code. This code is available at the output of the A to D converter circuit to be written into a random access memory 35.

The type of memory used according to the present method and apparatus is preferably a solid state random access device (RAM) including the necessary read and write address counters and controls which are explained further on. Use of a digital system with a solid state random access memory has been found to provide a satisfactory arrangement for proper timing and for proper centering of the picture on the TV screen. In an actual embodiment of the invention, the memory is provided by twelve 16K RAM chips (Mostek type 4116) as shown in further detail in FIG. 2 and later described.

The digital words are read from the RAM, processed through a parallel to serial converter 37 for timing purposes, then processed through a gray code to binary code converter 38, then supplied to a D to A converter 40. The digital information is written into the RAM from the A to D converter 30 at the lower frequency rate which corresponds to the line rate of the incoming facsimile type picture information. The digital information is read from the RAM at broadcast compatible video rates, such that when the information is processed through the D to A converter 40, the picture information is available for combination in a broadcast compatible TV signal.

The analog signal from the D to A is fed to colorizer circuit 42, which introduces color levels such that the background will produce a blue hue on a color video receiver, and the luminance information will produce varying intensities of yellow. This colorized signal is then fed to a blanking and burst gate circuit 45 which introduces sync information to the video signal, providing a complete television compatible signal with vertical and horizontal synchronizing components, color phase and burst information, etc. The composite broadcast compatible TV signal is then passed to a video output buffer amplifier circuit 48, from which the signal is made available on line 50.

Writing of digital information into the RAM, and reading of that information out of the RAM, is controlled by a pair of counters (a number of type 74161), identified as the write address counter 60, which includes a column counter 60a and a row counter 60b, while the reading of information from the RAM is under the control of a read address counter 65, including a column counter 65a and row counter 65b. It should be understood that the terms "row" and "column" in this context refer to the internal organization and structure of the individual 16K RAM circuits, rather than the total RAM. The write address and read address counters in turn communicate with the RAM through a conventional multiplexer circuit 68 (type 74153).

The apparatus includes an internal master oscillator 70 which makes available a 14.3 MHz signal for timing and sync derivation purposes, and a sync generator circuit 75 which receives an input from the master oscillator through an electronic switch 78, which is labeled the external/internal switch. The apparatus has input terminals for connection to external TV sync at 80, and to external 3.58 MHz color subcarrier frequency at 82. The external sync signal is applied through a sync buffer circuit 84 to the sync generator 75, so that the generator will synchronize with the external TV sync if such is available. The external color subcarrier frequency is supplied to a phase lock oscillator circuit 85 (basically Signetics type NE562) which also has a loop connection from the sync generator 75, and which is configured to output a 14.3 NHz driving signal locked to the 3.58 MHz subcarrier if it is available from an external source. Thus, the electronic switch 78 provides the master clock frequency at 14.3 MHz, either from the internal oscillator 70 of from the phase locked oscillator 85 which is synchronized with the external color subcarrier.

The sync generator circuit is essentially an integrated circuit which makes available all the necessary synchronizing signals for broadcast compatible color TV transmission of broadcast. A typical circuit is Fairchild integrated circuit type 3262B. It provides as outputs a vertical drive signal, at 60 Hz, a horizontal drive output at 15.75 Hz, the composite blanking signal which provides proper timing for the horizontal and vertical blanking intervals, a color burst flag signal, which locates the insertion of the color burst subcarrier into the "back porch" of the horizontal synchronizing and blanking interval (as is well known), the 3.58 MHz color subcarrier which is available for insertion at this location in the output signal, and the composite sync signal which is a combination of these. The sync generator has an input from external video sync to which it will lock, if available.

The outputs of the sync generator 75 are applied to a sync buffer circuit, along with the master clock output from the external/internal electronic switch 78. The sync buffer circuit in turn provides a horizontal drive signal which is made available both to the write address counter 60 and the read address counter 65, a vertical drive signal which is made available to the read address counter, and the burst flag signal (BFL) which is also made available to the read address counter for timing purposes, although it is at the same frequency, but somewhat delayed from the horizontal drive signal. The master clock pulse is also transmitted through the buffer circuit and is applied to a timing control 90, which in turn supplies appropriate blanking pulses to the D to A converter 40, and to the write control circuit 92, which in turn provides write control information to the write address counter 60, and to the RAM 35. Thus the timing control 90 and the write control circuit 92 cooperate to function as a write sample signal generator.

In order to introduce the artificial circular sweep into the output video signal, a circular sweep generator device 95 is also provided. It has synchronizing input from the sync buffer 88, and provides an output to the connection from the D to A converter 40 into the colorizer circuit 42, whereby the circular sweep signal is added to the video information supplied to the colorizer. Details of one such device are shown in FIG. 5. It consists of a motor 100 having a slow rotating shaft (about 6 to 10 rev./min.) which turns a disc 102 bearing a contrasting line 103. A vidicon camera 105 is focused on disc 102, and provides an output signal of the slowly rotating line 103 via line 106. The camera is synchronized to the system by sync signals from the sync generator 75.

FIG. 4 shows comparative wave forms and time intervals for the lower frequency picture input, at the top, and for the higher frequency video output signal, at the bottom. It will be noted that the input information, at 8 lines per second, requires approximately 125 ms., of which 15 ms. is occupied by the line sync information. Frame sync information is considerably longer, in the order of 200 ms. or greater. Thus, the picture component of one line of input picture information occupies approximately 110 ms., and is to be divided into 256 pulses, providing the 256 three-bit digital words which describe each pixel in one line of information.

The video output, on the other hand, has one line of information presented at 63.5 $\mu$s. (microsecond), of which the horizontal blanking interval occupies approximately 12.5 $\mu$s., leaving an actual video information time of 51 $\mu$s. Due to the difference in aspect ratio between the pictures, and since the input picture information is 1:1 aspect ratio, to center the picture on the television screen only the center portion, occupying approximately 40 $\mu$s. of one video line, is used. This requires a delay from beginning of a line, after the end of a horizontal blanking period, of about 5.5 $\mu$s.

Portions of the circuits controlling the writing into and reading of the RAM are shown in further detail in FIG. 2. The timing control 90 is shown as comprising an eight bit shaft register (type 74164) and a pair of flip-flop circuits F1 (type 7474) which cooperate with the shift register and an output gate to provide output timing signals. The input to the eight bit shift register is derived from the master clock pulse MCP which in turn comes from the sync buffer circuit 88 as shown in FIG. 1. This signal at 14.3 MHz is effectively divided by nine by the combination of the shift register and the two flip-flop circuits, providing sequence control outputs at approximately 1.59 MHz.

Considering first the Read mode, each input pixel is available from the A to D circuit for approximately 500 microseconds, which is roughly equivalent to 7.87 video lines. This is derived from the fact that each line of lower frequency picture information occupies about 125 ms., and at a sample rate of 2,000 samples per second, derived by dividing the horizontal sync output frequency (15.75 KHz) by seven, each sample time is approximately 500 $\mu$s. in duration. Reading into the RAM is enabled only during horizontal blanking period, which occupies about 12.5 $\mu$s. of each horizontal line. Thus, each input digital word identifying a pixel is available for reading during approximately seven horizontal blanking periods in video time. To read an entire picture takes approximately 100 seconds. Thus, the divide by seven counter advances counter 60b at a rate of approximately 2,000 samples per second (nominal) and counter 60a is advanced by the divide by three counter, which in turn receives its input from the lower frequency horizontal sync information derived at the sync detector circuit 27.

The readout pulse frequency is nominally 1.6 MHz, derived as explained above by dividing the 14.3 MHz MCP clock by nine in the shift register and flip-flop circuits of the timing control 90. During each of the read cycles of the shift register, there are output pulses to the row address strobe RAS, to the column address strobe CAS, and to the write control circuit 92, all of these at the nominal 1.6 MHz timing clock. As explained, it is necessary to read 256 pixels in 40 microseconds, and to gate off the RAM output until 5.5 microseconds after horizontal blanking ends, and for a like time before the next horizontal blanking period. Thus, the readout time for the RAM is a "window" of forty microseconds duration. Signals for this purpose are transmitted to the read address row counter 65b, and signals to advance the read address column counter 65a are derived from the sync generator through the HDR (horizontal drive) output of the sync buffer circuit 88.

The divide by seven counter receives horizontal drive input, thus it is cause to count and advance during the horizontal blanking interval, and its output pulses to the write address row counters are of the same timing. Therefore, a write operation occurs only during horizontal blanking time. (The divide by seven counter is reset by every lower frequency horizontal sync pulse.) Furthermore, this same inverted drive signal is connected to pins 1 and 2 of the dual flip-flop F1 which cooperates with the eight-bit shift register in the timing control circuit 90. This input is identified by the legend $\overline{HDR}$. This assures further that read control signals to the read address counters, or the the RAM, are inhibited during the horizontal blanking interval of the video signal.

The 14.3 MHz MCP clock input to the timing control circuit 90 also is directed to pin 3 of a dual flip-flop F2 circuit shown to the right of the timing control circuit shown in FIG. 2. The output on pin 5 from this flip-flop circuit provides a 7.15 MHz timing signal which is used to drive the shift registers (type 74194) of the parallel to serial converter circuit 37. The purpose of this is merely to allow time for the digital information being read from the RAM to be outputted, since the demands upon the read mode are somewhat in excess of the serial output capability of the RAM circuit. The converter 37 receives the digital information in parallel form, as shown in FIG. 2, and passes it on in serial form over three lines, as a three-bit gray code, to pins 9, 5, and 12 of the gate circuits in the gray to binary code converter 38.

Referring again to the eight bit shift register in the timing control circuit 90, the first in the series of timing control pulses (all at the nominal 1.6 MHz rates) is outputted on pin 3 which is directed to three different locations. One is to provide an input to pin 3 of the dual flip-flop which cooperates with the shift register in providing a divide by nine counter. The second location is a connection to pin 11 of the dual flip-flop in the write control circuit 92, where this pulse is used as a strobe, being gated by the input at pin 12 of the same flip-flop. Its purpose is explained hereafter. The third location is a connection to the reset (pin 1) of the dividing dual flip-flop F2 in the timing control circuit which provides the aforementioned 7 MHz clock output.

The second in the sequence of the timing pulses from the eight bit shift register is on pin 4, leading to an inverter which in turn is tied to the $\overline{RAS}$ (row address strobe) pins of each of the RAM circuits. This signal also is connected as a gating signal to pin 10 on each of the parallel to serial converters.

The next timing pulse appears on pin 6 of the eight bit shift register, and it provides an ouput which is directed to the multiplexer circuit 68, providing read gating of the multiplexer acting between the write and read address counters and the RAM.

The next timing pulse output is on pin 10, leading through an inverter to pins 15 of each of the RAM circuits, providing the $\overline{CAS}$ (column address strobe) signal to each of them.

The final timing pulse from the eight bit shift register is on pin 13. This is connected to pin 12 of the dual flip-flop F1, providing the carry function to achieve division by nine. This output also is connected to the clock input of the read address row counter 65b.

Referring to the write control circuit 92, at the lower right corner of FIG. 2, the input to the dual flip-flop circuit F3 (on pin 3) is derived from the divide by seven counter output, which also provides clock signals to the write row address counter. The reset for this flip-flop is in turn derived from the output of the second half of the dual flip-flop, at pin 8.

Thus, each output of the divide by seven counter provides an output at pin 5 of the write control flip-flop F3, and it is directed to pin 12 of the second half of that flip-flop, providing a gating function for the timing pulses which come from pin 3 of the timing control shift register as previously mentioned, and serving when the next of those timing pulses arrive to provide an output on pin 9 which is directed to the multiplexer circuit, to enable the write mode thereof from the write address counters.

The next timing pulse to pin 11 causes the second half of the flip-flop circuit F3 to reset the first half, and also provide a pulse to pin 3 of the write control decoder circuit (type 74138).

This is one of three inputs to the decoder, the other two inputs on pins 1 and 2 coming from the two lowest order outputs of the write address row counter. The outputs from the decoder circuit, on pins 12, 13, 14, and 15, are directed to the write enable ($\overline{WE}$) inputs on the various RAM circuits, there being a separate write enable pulse for each row. For example, pin 15 of the decoder is tied to pin 3 on the RAM circuits U27, U31, and U35, and so, as shown on the drawing.

FIG. 5 shows in block diagram the relation of the write address counters, their inputs, the multiplexer 68, and the write control decoder. The counter 60b functions as a divide by four and a divide by sixty-four counter. Thus the inputs from the divide by seven counter are processed through the divide by four section and it in turn outputs a two bit code to the decoder (pins 1 and 2) in the write control circuit. This decides which section of the RAM is write enabled. The write enable pulses thus are controlled by the write control flip-flop F3, but are derived from the timing control shift register (pin 3).

Referring again to the timing control circuit 90 (lower right corner) the input to the inverter, which provides an output to pin 12 and to pin 4 of the dual flip-flop circuit F2, is derived from the overflow of the read address row counter. In other words, a signal appears at pins 4 and 12 of this circuit F2, at the end of scanning of each line of information from the RAM. The input to pin 11 of the flip-flop is derived from a low order carry of the read address row counter, preferably the second lowest carry, and merely provides a delay function, such that the output on pin 9 is shifted back in time somewhat from the input on pin 12. The output on pin 9 is directed to the gating inputs of the three AND gates in the D to A circuit 40 (FIG. 3) and thus provides the function of gating off the RAM output on opposite sides of the video picture, for reasons previously explained.

It will be seen from the foregoing that the digital output from the gray code to Binary code converter circuit in FIG. 2 is directed to the D to A converter in FIG. 3, and gated thereinto by the scanning control which times the read address scanning of the RAM. The remainder of circuit 40 is essentially a Binary weighted resistor D to A circuit, into which is also coupled the circular sweep output signal from line 106 (FIG. 5). The analog output signal can be adjusted by the potentiometer as shown, and is then directed, as a luminance signal, to pin 5 of the dual differential amplifier (Motorola type MC 1445) in the blanking circuit 45. The other output from the D to A circuit passes from pin 6 of the inverter to an emitter-follower buffer, and is used to gate a dual differential amplifier in the colorizer circuit 42.

The inputs to the aforementioned amplifier in the colorizer circuit are provided to pins 4 and 5, while pins 6 and 3 are connected to ground. In this circuit pins 3 and 4 represent the input to one of the two amplifiers, and pins 5 and 6 are the inputs to the other. Pin 4 and 5 are at opposite polarity, and these are connected to the 3.58 MHz subcarrier output from pin 15 in the video sync generator 75. Therefore, the 3.58 MHz subcarrier is available in opposite polarity to the input to the colorizer circuit, and by gating the colorizer switching amplifier with the luminance signal at pin 2, the subcarrier is available at 0° or 180° phase, thus providing the color signal for the video output. This signal is passed through a potentiometer at the output of the switching amplifier to pin 6 of another dual differential amplifier in blanking circuit 45. Here, the luminance signal from the D to A converter is applied to pin 5, and the aforementioned color signal is applied to pin 6.

Pin 3 is set to a DC bias which is adjustable (internally) for purposes of setting the DC level of the front porch and back porch of the blanking interval in the video output signal. The color burst or reference in the horizontal blanking component is derived from the burst gate circuit. Here the same type MC 1445 amplifier circuit is used, with the 3.58 MHz subcarrier source being the input to pin 5, and the other inputs being tied to ground. The gating control to pin 2 of the burst gate amplifier is derived from the burst flag output BFL, from output pin 5 of the sync generator. This signal gates on the burst gate amplifier during the appropriate portion of the back porch segment of the horizontal blanking period, to apply the reference color subcarrier thereto as is well known. This reference appears at the output of the burst gate and is added to the pin 4 input of the blanking circuit 45, along with the composite sync output which is derived from pin 6 of the sync generator circuit, through a sync level control potentiometer. Thus, composite sync and color reference burst are applied at pin 4, and the DC level is applied at pin 3 of the blanking circuit, while the luminance and color components of the video signal are applied at pins 5 and 6. Switching is derived from pin 4 of the sync generator, which provides a composite blanking signal. This is used to gate the two input amplifiers of the blanking circuit alternately, thereby mixing the video and blanking inputs into a composite video signal at output pin 7, where it is passed through to the output buffer amplifier 48 from which is available as a broadcast compatible television signal.

The burst flag output BFL is also passed through the output sync buffer 88, along with the higher frequency vertical drive signal VDR, and the higher frequency horizontal switching signal HDR. These circuits are shown generally in the block diagram, FIG. 1. The sync buffer 88 also provides an output for the 14.3 MHz master clock pulse MCP, which is derived from the output of the external/internal switch 78.

The resulting output signal produces a television picture with a blue background and picture elements of varying intensities of yellow. The general form of such picture is shown in FIG. 7 of the drawings. the center of picture represents the focal point of the radar station from which the facsimile signal originated. The concentric circles represent the range lines of that station, and the irregular formations shown represent storms detected by the weather radar. In addition to the range signals there are geographical boundaries such as shore lines, state boundaries, etc., but these are omitted from FIG. 7 since it does not represent a picture from any specific radar station.

There are also longhand notations (explained below) made by an operator at the radar station. These, along with the range circles and boundary lines, come from a transparent overlay to the radar scope, which shows the storm or cloud echoes, and this "scene" is picked up by the vidicon camera which in turn outputs to a facsimile transmitted for low frequency picture transmission, as explained above. Also not shown in FIG. 7 is the artificial sweep line which appears in the television picture.

The legends or notations shown on FIG. 7 are as follows:

TRW+A/+—meaning, thunder and rain showers (TRW), heavy (+), with hail (A), increasing in intensity (/+);

C285—meaning, the cell is moving from 280° (generally from the west) at 25 knots;

MT270—meaning, maximum tops of the cell are 27,000 feet;

O430Z—meaning, report written at 4:30 a.m. Greenwich Mean Time.

Thus, with an understanding of these notations and the display on an ordinary color television, it is possible to comprehend substantial detail of the radar display. The present invention permits pictures to be received and converted into television picture information from any of the U.S. Weather Bureau Radar Stations, and these can be transmitted through TV stations, or cable systems, can be recorded for later presentation alone or in timed sequences, or handled in any other manner of television recording. A full explanation of symbols used by the radar stations in making the notations on the overlay is available from the U.S. Weather Bureau, as well as from other sources.

While the method herein described and the form of apparatus for carrying this method into effect, constitute preferred embodiments of this invention, it is to be understood that the invention is not limited to this precise method and form of apparatus, and that changes may be made in either without departing from the scope of the invention.

What is claimed is:

1. Apparatus for creating a broadcast compatible composit video signal from lower frequency picture information of a different format such as is transmitted over telephone circuits comprising
    (1) demodulating detector means having an input for receiving the lower frequency picture information,
    (2) sync separating means receiving the output of said detector means and generating therefrom line and frame sync signals of the lower frequency,
    (3) an A to D converter receiving said lower frequency picture information and providing a corresponding digital output,
    (4) a RAM having sufficient capacity to store digital information in line by line fashion for a field of broadcast video,
    (5) write control means, including
        write address counter means responsive to said lower frequency line and frame sync signals,
        a write sample signal generator controlling the sequential write addressing of said RAM to store the digital output of said A to D as a series of groups of digital words, each group of which represents one line of picture information, and said line sync signal controlling the storage of said digital word groups as distinct line information,
        first divider means operative from said sync separating means to advance said write address counter means at a rate less than said lower frequency line sync signals to reduce the number of word groups of stored information to be compatible with broadcast video standards,
    (6) a video sync generator providing vertical drive and horizontal drive video sync signals at broadcast compatible rates,
    (7) second divider means receiving horizontal video sync signals from said video sync generator and transmitting a division of said video sync signals to said write address counters whereby the digital words are read into said RAM during horizontal blanking periods of the video sync generator, and at a rate which is related to the number of stored lines such that a stored frame of information has an aspect ratio of at least 1:1,
    (8) read control means including read address counters receiving control inputs from said video sync generator to control the reading of stored digital words from said RAM,
    (9) a D to A converter receiving digital input information from said RAM and producing a corresponding analog output signal, and
    (10) output means including a blanking circuit receiving the output signal from said D to A converter and video sync signals from said video sync generator and combining them into a broadcast compatible composite video output signal.

2. Apparatus as defined in claim 1, including a circular sweep generator producing a sweep video signal reproducible as a slowly rotating line,
    and means connecting the output of said sweep generator to said D to A converter for addition to the signal supplied to said output means.

3. Apparatus as defined in claims 1 or 2, including black level adjusting means receiving the output of said detector means and providing control of the lower frequency picture information to a predetermined black level base.

4. Apparatus as defined in claims 1 or 2, wherein said demodulating detector means includes
    an FM detector adapted to detect picture information from an FM signal transmitted over telephone lines,
    an AM detector circuit arranged to detect picture information from an AM signal transmitted over dedicated lines,
    said AM detector including an automatic gain control,
    and a switch connected to direct the outputs of said FM detector or said AM detector circuit alternatively to said sync separating means and said filter/amplifier.

5. Apparatus as defined in claims 1 or 2, including
    a colorizer circuit between said D to A converter and said output means to set the color value of the output video signal at a blue background and yellow video picture of intensity corresponding to the analog signal output of the D to A converter.

6. Apparatus as defined in claims 1 or 2 wherein said RAM has capacity to store 256×256 digital words, each group of digital words comprising 256 words making up one line of information,
    said lower frequency picture information being transmitted at 8 lines per second,
    said video signal generator providing broadcast compatible video horizontal sync at 15,750 Hz,
    said second divider means dividing the video horizontal sync by 7 to provide a digitizing frequency in the order of 256 pulses per line of lower frequency information,
    a timing generator synchronized with said video signal generator and providing a master clock signal, and
    said read control means utilizing the master clock signal to read one word group of 256 words from said RAM within one period of horizontal video sync.

7. Apparatus as defined in claim 1, wherein said lower frequency picture information contains 800 lines per frame, and said first divider means advances said write address counter from row to row at one third the line rate of the lower frequency picture information to provide a stored frame of 1:1 aspect ratio.

8. A method for converting facsimile picture information transmittable over telephone circuits into broadcast compatible composite video signals, comprising the steps of
    demodulating and detecting the picture and line sync components of the facsimile signal and converting the picture components into graded digital words and storing such into a RAM,
    generating composite broadcast compatible video sync signals including horizontal and color subcarrier signals and timing signal synchronized therewith,
    dividing both the video horizontal sync and the facsimile line sync components and using such divisions of the video horizontal sync and the facsimile line sync components to write address the RAM and store the digital words in groups corresponding to lines of picture information at an aspect ratio compatible with broadcast video signals, using the video horizontal sync and timing signal synchronized therewith to read address the RAM and to read a group of digital words successively within the line interval of a broadcast video signal into a D to A converter as the write addressing proceeds, and adding the video sync signals to the output of the D to A converter and thus providing a broadcast compatible video output of the input facsimile picture.

* * * * *